Figure 1:
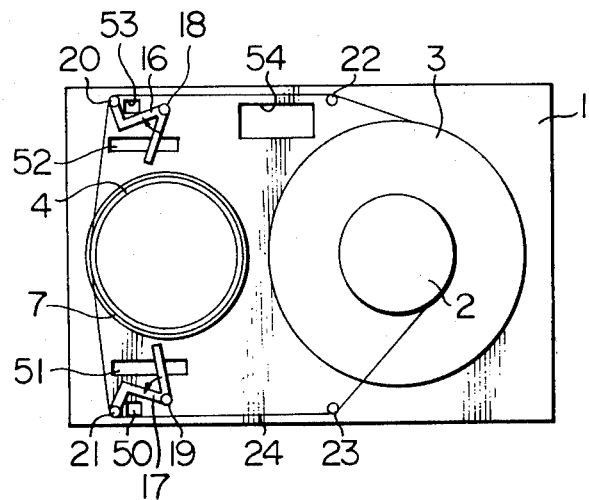

United States Patent [19]

Hiroyasu

[11] 4,056,834
[45] Nov. 1, 1977

[54] MAGNETIC VIDEO RECORDER AND CASSETTE PROVIDING TAPE LOADING

[75] Inventor: Mamoru Hiroyasu, Saijo, Japan

[73] Assignee: Matsushita Electric Industrial Co., Ltd., Osaka, Japan

[21] Appl. No.: 688,288

[22] Filed: May 20, 1976

[30] Foreign Application Priority Data

May 26, 1975 Japan .................................. 50-63186

[51] Int. Cl.² ...................... G11B 15/66; G11B 23/04
[52] U.S. Cl. ...................................... 360/85; 360/130; 360/132
[58] Field of Search .......................... 360/132, 85, 130

[56] References Cited

U.S. PATENT DOCUMENTS

| | | | |
|---|---|---|---|
| 3,639,697 | 2/1972 | Koguma et al. | 360/85 |
| 3,947,892 | 3/1976 | Saito et al. | 360/85 |

*Primary Examiner*—Robert S. Tupper
*Attorney, Agent, or Firm*—Stevens, Davis, Miller & Mosher

[57] ABSTRACT

In a cassette casing having a supply reel, a take-up reel and a hollow cylindrical member, a magnetic tape is fed from the supply reel and, after having been spirally wound around the intermediate hollow cylindrical member, is wound on the take-up reel. To this end, the hollow cylindrical member is formed with a spiral guide rib with a pitch substantially equal to the width of the magnetic tape and threadedly or screwwisely received in an opening formed in the bottom plate of the cassette casing. When the cassette casing is placed in the position in which it is ready for operation within a video recording and reproducing apparatus, a rotatable magnetic head drum having a magnetic head is inserted into the cylindrical member. Thereafter, the cylindrical member is moved outwardly from the cassette casing by rotating it through a driving apparatus, whereby the magnetic tape wound around the cylindrical member is progressively transferred onto the head drum to the position for recording or reproducing. When the cassette casing is to be removed from the apparatus, the hollow cylindrical member is rotated in the reverse direction to be inserted into the casette casing by virtue of the threaded engagement with the opening formed in the bottom plate of the cassette casing. Then, the magnetic tape is transferred back to the cylindrical member from the magnetic head-drum.

7 Claims, 9 Drawing Figures

MAGNETIC VIDEO RECORDER AND CASSETTE PROVIDING TAPE LOADING

The present invention relates to a magnetic video recording and reproducing apparatus of the cassette type and in particular relates to a magnetic video recording and reproducing apparatus of the helical scanning type in which a magnetic tape is spirally wound around a head drum having a magnetic head so that the magnetic tape may run in an inclined state with a predetermined angle relative to the rotation path of the magnetic head whereby the rotating magnetic head performs the scanning operation along the parallel recording tracks inclined relative to the longitudinal axis of the tape.

Since the provision of a magnetic tape contained in a cassette facilitates the mounting and the removal of the tape from the magnetic video recording and reproducing apparatus and additionally assures protection of the magnetic tape, the so-called cassette tape has been practically employed in magnetic video recording and reproducing apparatus of the stationary head type.

However, the attempt to use cassette tape in magnetic video recording and reproducing apparatus of the helical scanning type has encountered considerable difficulty in that a complicated mechanism is required for positioning the magnetic tape contained in the cassette as wound around the cylindrical magnetic head drum in a spiral form with a predetermined angle relative to the longitudinal axis of the drum. Particularly in the case of the magnetic video recording and reproducing apparatus of a single helical scanning head type, the magnetic tape has to be spirally wound around the drum for 360° along the rotational path of the magnetic head, which renders it more difficult to use the magnetic tape accommodated within the cassette.

An object of the present invention is accordingly to provide a novel magnetic video recording and reproducing apparatus of the helical scanning type which facilitates mounting and removal of the magnetic tape contained in a cassette.

With the object in view, there is provided according to the invention a magnetic video recording and reproducing apparatus comprising; a cassette casing, a supply reel and a take-up reel accommodated rotatably within the cassette casing, a hollow cylindrical member to wind spirally therearound a magnetic tape fed from the supply reel and taken up by the take-up reel, a supporting means for supporting the hollow cylindrical member in such a manner that the hollow cylindrical member is moved in the axial direction when the cylindrical member is rotated about the longitudinal axis thereof, a magnetic head drum having a rotatable magnetic head, the magnetic head drum being provided in the magnetic video recording and reproducing apparatus and adapted to be received in the hollow interior of the hollow cylindrical member, and a driving means mounted in the magnetic video recording and reproducing apparatus and adapted to engage with the hollow cylindrical member for driving it rotationally in reversible directions, wherein the magnetic tape wound around the hollow cylindrical member is transferred onto the magnetic head drum when the hollow cylindrical member is withdrawn from the cassette casing by rotating the hollow cylindrical drum in one direction through the driving means, while the magnetic tape wound around the magnetic head drum is transferred onto the hollow cylindrical member when the latter is moved into the cassette casing by rotating the hollow cylindrical member in the other direction through the driving means.

Figure 2:
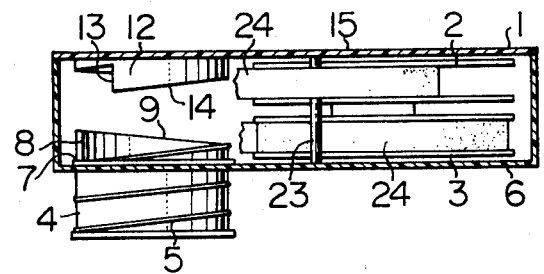
Figure 3:
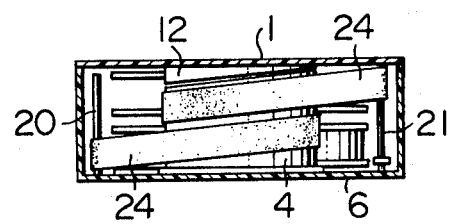
Figure 4:
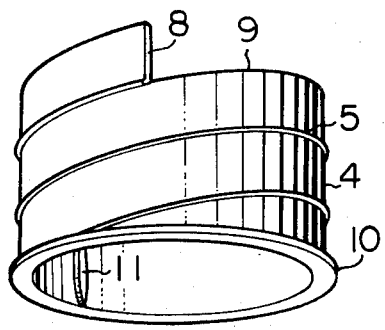
Figure 5:
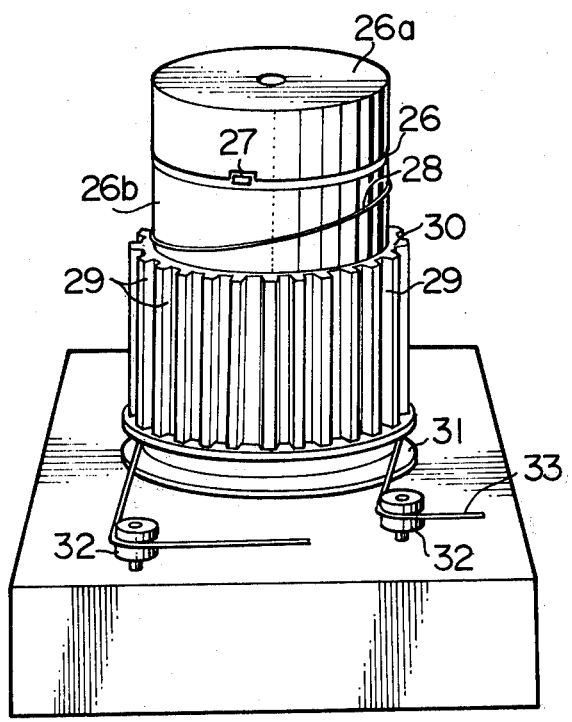
Figure 6:
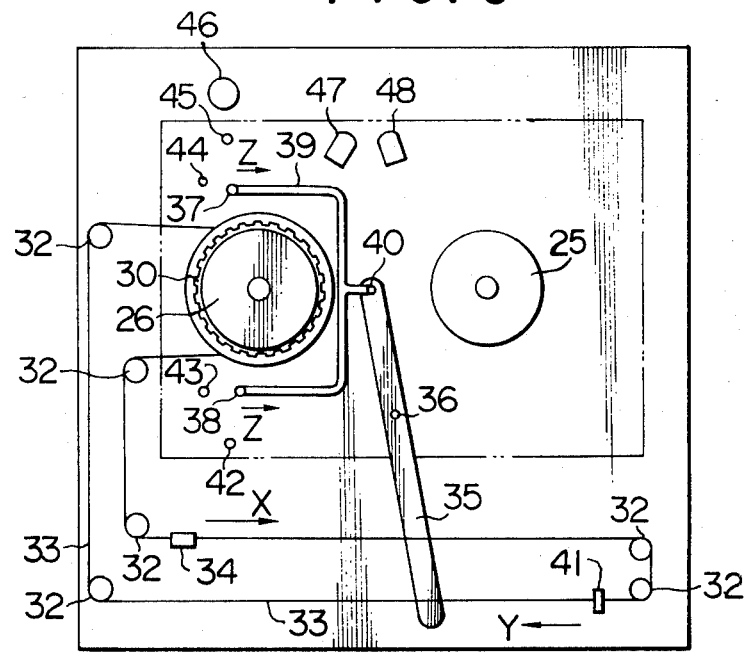
Figure 7:
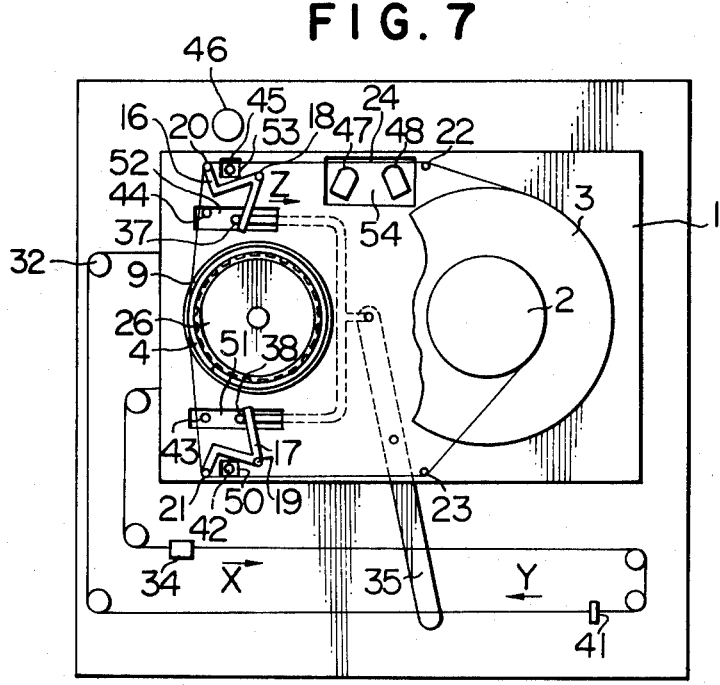
Figure 8:
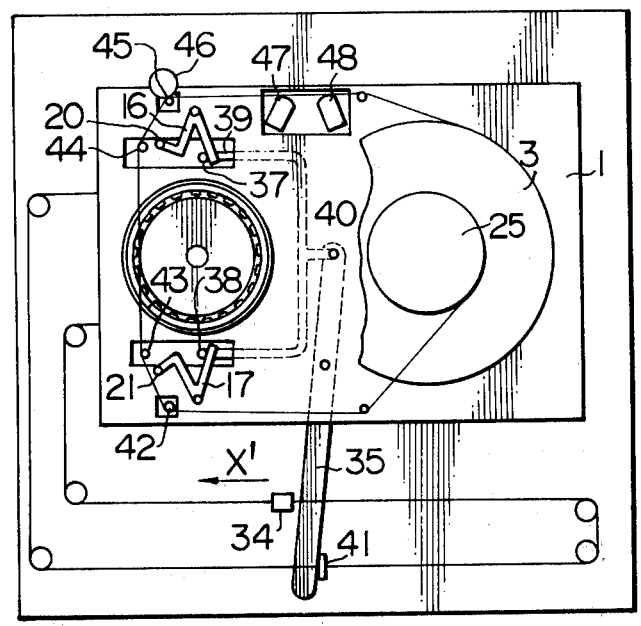
Figure 9:
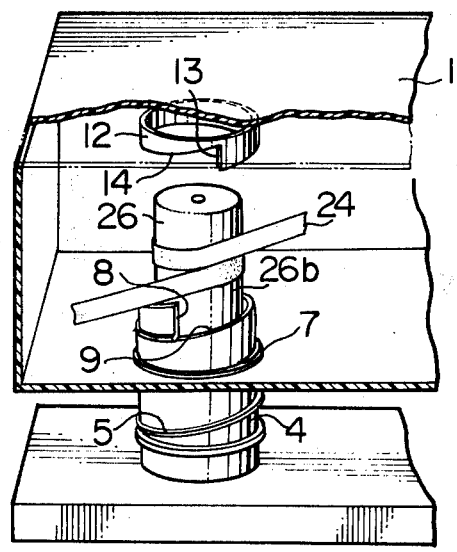

The above and other objects, novel feature as well as advantages of the invention will become more apparent by examining the description of a preferred embodiment of the invention taken in conjunction with the accompanying drawings, in which:

FIG. 1 is a top plan view showing a magnetic tape cassette according to an embodiment of the invention with the top plate of the cassette being removed, FIG. 2 shows the same in the side view with a side plate removed, FIG. 3 show the same in a front view with the side plate removed, FIG. 4 is the perspective view showing a lower cylindrical member employed in the tape cassette shown in FIGS. 1 to 3, FIG. 5 shows the construction of the magnetic head drum employed in a magnetic video tape recording and reproducing apparatus of the helical scanning type, FIG. 6 shows in a top plan view a general arrangement of a magnetic video recording and reproducing apparatus according to the invention, FIG. 7 shows the same in the top plan view with the tape cassette mounted therein, FIG. 8 shows the apparatus in the recording or reproducing state, and FIG. 9 is a perspective view showing the magnetic head drum in the recording or reproducing position.

Referring to FIGS. 1 to 4 which show an embodiment of a magnetic tape cassette according to the invention, it comprises a box-like cassette casing 1, a supply reel 2 and a take-up reel 3. These reels 2 and 3 are coaxially mounted in the cassette casing 1 so that they can be rotated independently of each other as is in the case of a conventional tape cassette of the tandem type. Reference numeral 4 indicates a lower hollow cylinder having a guide rib or protrusion 5 which is formed spirally in the peripheral surface of the cylindrical member 4 with a pitch substantially equal to the width of the magnetic tape to be guided, as is shown clearly in FIG. 4. The hollow cylindrical member 4 is so arranged that it may be moved in or out of the interior of the cassette through an opening formed in a bottom plate of the cassette casing 1.

More particularly, there is provided in the bottom plate 6 of the cassette a supporting ring 7 which is adapted to be threadedly or screwwisely engaged with the spiral guide rib 5, whereby the cylindrical member 4 can be moved in or out of the cassette casing 1 by rotating the cylindrical member 4.

Referring to FIG. 4, it should be noted that the cylindrical member 4 has an upper end 9 which is slanted relative to the longitudinal axis of the cylinder 4 with an angle equal to the pitch angle of the guide rib 5 and formed with a notched edge 8 extending parallel to the longitudinal axis. Further, the cylindrical member 4 is provided with a collar 10 of a large diameter at a lower portion thereof, the collar 10 serving to limit the depth of insertion of the cylindrical member 4 in the cassette casing 1 at a desired value. It is further noted that the hollow cylindrical member 4 has a bar-like projection 11 formed in the inner surface thereof.

Reference numeral 12 denotes an upper hollow cylindrical member which has the same diameter as that of the lower cylindrical member 4 and is securely fixed to a top plate 15 constituting the cassette casing 1. The upper cylindrical member 12 has a lower slanted end 14 and a notched edge 13 which are so formed as to snugly engage with the slanted or bevelled end 9 and the notched edge 8 of the lower cylindrical member 4 (FIG. 9). It will be appreciated that, when the lower cylindrical member 4 is inserted into the cassette casing 1, it constitutes in cooperation with the engaged upper cylindrical member 12 a cylinder body extending continuously from the bottom to the top plate of the cassette casing.

As can be seem from FIG. 1, angle levers 16 and 17 are mounted on the bottom plate of the cassette casing 1 rotatably about the respective supporting studs 18 and 19. These levers 16 and 17 have, respectively, pins 20 and 21 anchored therein. Reference numerals 22 and 23 denote magnetic tape guide posts secured to the cassette casing 1.

The magnetic tape 24 is fed from the supply reel 2, guided around the guide post 23 and the pin 21 and, after having been wound around the lower cylindrical member 4 for 360°, is taken up by the take up reel 3 after being guided by the pin 20 and the post 22. The levers 16 and 17 are urged to be rotated in the directions indicated by arrows (FIG. 1) by means of suitable springs (not shown) so that the magnetic tape 24 may be maintained constantly in a tensioned state with the closed loop of the running path of the magnetic tape 24 from the supply reel to the take-up reel being correspondingly lengthened or enlarged.

Referring to FIG. 6 which shows in a plan view a general arrangement of a magnetic video recording and reproducing apparatus according to the invention, the cassette casing 1 is adapted to be mounted from above in the position indicated by the broken line.

Numeral 25 indicates a driving table adapted to engage the supply reel 2 and the take up reel 3 and resting thereon thereby driving the two reels.

A head drum assembly 26 comprises an upper head drum 26a adapted to be driven by a motor and a stationary head drum 26b as shown in FIG. 5. The upper head drum 26a is provided with a magnetic head 27, while the lower head drum 26b in formed with a spiral guide rib 28 to define the running path of the magnetic tape on the drum. A cylindrical member 30 is rotatably mounted around the lower portion of the lower head drum 26b and has a plurality of grooves 29 formed in the outer peripheral surface so as to engage with the projection 11 formed in the lower cylindrical member 4 at the inner surface, as hereinbefore described.

The cylindrical member 30 has a pulley 31 secured thereto around which an endless cord or rope extends, cord 33 being 32. As schematically shown in FIG. 6, a manipulating knob 34 is securedly carried by the endless rope 33 and adapted to be manually operated exteriorly of the apparatus. By slidably moving the knob 34 in the direction indicated by the arrow X or in the opposite direction, the cylindrical member 30 is rotationally driven in either one of the directions.

A manipulating lever 35 is also mounted rotatably around a stud 36 and has an end portion to which a slide lever 39 is pivotally connected through a pin 40. The lever 39 has bifurcated arms which extend along both sides of the head drum 26 in a manner to enclose the drum 26 and have pins 37 and 38 secured at the free end portions.

When the rope 33 is moved in the direction indicated by the arrow X through the corresponding manipulation of the knob 34, a lever actuation piece 41 secured to the rope 33 will engage with the free end of the lever 35, whereby the latter is rotated in the clockwise direction, which in turn results in the displacement of the pins 37 and 38 in the direction indicated by the arrows Z (FIG. 6).

The magnetic video recording and reproducing apparatus further comprises tape guide posts 42, 43 and 44 secured thereto, a capstan shaft 45, a pinch roller 46 adapted to disengageably bear on the capstan shaft 45 by a well known means, an erasing head 47 and a head 48 for sound signals.

Operation of the apparatus described above is effected in the following manner.

The cassette 1 is placed from above in the apparatus which is positioned in the state shown in FIG. 6. Then, the reel driving table 25 will engage with the supply reel 2 and the take-up reel 3 within the cassette casing 1. The magnetic head drum assembly 26 is inserted into the lower cylindrical member 4 with the bar-like projection formed therein engaging slideably with one of the grooves 29 formed in the outer surface of the cylindrical member 30. Further, the tape guide posts 42, 43 and 44, the capstan shaft 45, pins 37 and 38 as well as the magnetic heads 47 and 48 will project into the cassette casing 1 through the associated through holes 50, 51, 52, 53 and 54 formed in the bottom plate of the cassette casing. The state in which the cassette has thus been placed in the apparatus is shown in FIG. 7.

When the manipulating knob 34 is moved in the direction indicated by the arrow X from the above state, the cylindrical member 30 is rotated by means of the rope 33, which in turn brings about a corresponding rotation of the lower cylindrical member 4 through the engaged projection 11. As the lower cylindrical member 4 is rotated, it is moved downwardly out of the cassette casing through the associated aperture, whereby the magnetic tape 24 wound on the lower cylindrical member 4 is transferred onto the head drum assembly 26 (FIG. 9).

On the other hand, when the rope 33 is moved as described above, the lever actuating piece 41 secured to the rope 33 will engage with the lever 35 to rotate it in the clockwise direction. As a result, the pins 37 and 38 are displaced in the direction indicated by the arrows Z to engage with the associated angle levers 16 and 17 which are then rotated against the resilient biasing force in the direction to move the pins 20 and 21 away from the magnetic tape. The magnetic tape 24 is now supported by the tape guide posts 42, 43 and 44 as well as the capstan shaft 45 secured to the apparatus.

By pushing the pinch roller 46 into the cassette through an associated throughhole formed in the side wall thereof thereby to bear on the capstan shaft 45, the apparatus attains the position in which it is ready for the recording or reproducing operation (FIG. 8).

When the cassette is to be removed from the apparatus, the pinch roller 46 is first disengaged from the capstan shaft 45. Then, the manipulating knob is moved in the direction indicated by the arrow X' to thereby rotate the cylindrical member 30 in the opposite direction. The lower cylindrical member 4 is simultaneously rotated to move upwardly into the cassette. The notched edge 8 formed in the cylindrical member 4 at the upper end thereof will then interposed between the head drum assembly 26 and the magnetic tape 24, whereby the magnetic tape 24 is progressibly wound on the lower cylindrical member 4, as the latter is moved upwardly through the rotation.

Upon the actuation of the knob 34 in the sense described above, the lever actuating piece 41 is disengaged from the lever 35 which is then returned to the starting position shown in FIG. 7 under the influence of a biasing spring (not shown). At the same time, the levers 16 and 17 are also reset to the starting state by means of the return springs (not shown). Consequently, the magnetic tape 24 is now supported by the pins 20 and 21 of the levers 16 and 17, respectively, whereby the closed loop of the magnetic tape is enlarged and the tape is disengaged from the guide posts 42, 43 and 44, the capstan 45 and the magnetic heads 47 and 48, as is shown in FIG. 7. Thus, the cassette casing 1 can be easily removed from the apparatus.

Although the invention has been described in conjunction with a preferred embodiment thereof, it should be appreciated that the invention is never restricted to the illustrated embodiment, but many variations and modifications are conceivable without departing from the spirit and scope of the invention. For example, although the cylindrical member 30 for rotating the lower cylindrical member 4 is driven by the rope 33 through the manually operated knob or grip 34, it is possible to impart the rotation to the cylinder 30 in either direction by employing a reversible electric motor.

From the foregoing description, it will be appreciated that the invention makes it possible to utlize a cassette tape in a magnetic video recording and reproducing apparatus of a helical scanning type.

I claim:

1. In combination, a magnetic tape cassette and a magnetic video recording and reproducing apparatus for use with a magnetic tape, said magnetic tape cassette comprising, a cassette casing, supply and take-up reels mounted rotatably within said cassette casing, said magnetic tape being supplied by said supply reel and taken up by said take-up reel, a hollow cylindrical member having a longitudinal axis defining an axial direction, said magnetic tape being wound spirally around said hollow cylindrical member, supporting means for supporting said hollow cylindrical member within said cassette casing so that said hollow cylindrical member is translated in the axial direction when said hollow cylindrical member is rotated about said longitudinal axis, and said magnetic video recording and reproducing apparatus comprising, a magnetic head drum having a rotatable magnetic head, said magnetic head drum being received in the hollow interior of said hollow cylindrical member when said magnetic tape cassette is mounted on said magnetic video recording and reproducing apparatus, and driving means mounted within said magnetic video recording and reproducing apparatus for engaging said hollow cylindrical member and rotating it selectively in either direction, said magnetic tape wound around said hollow cylindrical member being thereby transferred onto said magnetic head drum when said hollow cylindrical member is withdrawn from said cassette case by rotating it in one direction by said driving means, said magnetic tape wound around said magnetic head drum being transferred onto said hollow cylindrical member when said hollow cylindrical member is moved into said cassette casing by rotation thereof in the opposite direction by said driving means.

2. The combination set forth in claim 1, wherein said supporting means comprising a spiral guide rib formed in the outer peripheral surface of said hollow cylindrical member with a pitch substantially equal to the width of said magnetic tape, and a supporting ring secured to a bottom plate of said cassette casing defining an opening adapted to threadedly or screwwisely engage with said guide rib.

3. The combination set forth in claim 1, wherein said driving means for driving said hollow cylindrical member comprises a driving cylinder mounted rotatably at a lower portion of said magnetic head drum coaxially therewith, engaging means for engaging said driving cylinder and said hollow cylindrical member with each other for simultaneous rotation thereof while allowing axial movement of said hollow cylindrical member relative to said driving cylinder, and a driving means for rotating said driving cylinder.

4. The combination set forth in claim 3, wherein said engaging means further comprises a bar-like protection formed in the inner surface of said hollow cylindrical member and extending along the axis thereof and a plurality of axially extending grooves formed in the outer peripheral surface of said driving cylinder for engagement with said projection.

5. The combination set forth in claim 3, wherein said driving means for rotating said driving cylinder comprises an endless rope suspended around a pulley formed in said driving cylinder and means for moving said rope.

6. The combination set forth in claim 1, further comprising at least two rotatable levers provided in said cassette casing and having guide pins which slidably engage said magnetic tape, spring means for constantly applying tension to said roatatable levers in the direction to lengthen the guide path of said magnetic tape, a slidable member provided in said magnetic video recording and reproducing apparatus for slidably engaging said rotatable levers to rotate said levers against the force of said spring means, at least two guide posts slidably contacting said magnetic tape so that said magnetic tape is wound on said magnetic head drum in a predetermined position, whereby said magnetic tape is caused to disengage from said guide pins of said rotatable lever and slidably engage with said guide posts when said rotatable levers are rotated against the force of said spring by means of said slidable means.

7. The combination set forth in claim 6, further comprising means for interlocking said slidable means to said driving means for rotating said hollow cylindrical means.

* * * * *